(12) United States Patent  
Ben-Natan et al.

(10) Patent No.: US 9,760,571 B1
(45) Date of Patent: Sep. 12, 2017

(54) TABULAR DB INTERFACE FOR UNSTRUCTURED DATA

(71) Applicants: Ron Ben-Natan, Lexington, MA (US); Ury Segal, Vancouver (CA)

(72) Inventors: Ron Ben-Natan, Lexington, MA (US); Ury Segal, Vancouver (CA)

(73) Assignee: JSONAR Inc., Lexington, MA (US)

( * ) Notice: Subject to any disclaimer, the term of this patent is extended or adjusted under 35 U.S.C. 154(b) by 421 days.

(21) Appl. No.: 14/338,634

(22) Filed: Jul. 23, 2014

Related U.S. Application Data

(60) Provisional application No. 61/958,189, filed on Jul. 23, 2013, provisional application No. 61/959,470, filed on Aug. 26, 2013.

(51) Int. Cl.
 *G06F 17/30* (2006.01)
(52) U.S. Cl.
 CPC .............................. *G06F 17/30011* (2013.01)
(58) Field of Classification Search
 CPC ................................................ G06F 17/30011
 See application file for complete search history.

(56) References Cited

U.S. PATENT DOCUMENTS

| | | | | |
|---|---|---|---|---|
| 8,301,634 B2* | 10/2012 | Meadway | ......... | G06F 17/30575 707/740 |
| 2004/0163043 A1* | 8/2004 | Baudin | ............ | G06F 17/30616 715/234 |
| 2005/0240943 A1* | 10/2005 | Smith | ..................... | G06F 9/465 719/328 |
| 2011/0246535 A1* | 10/2011 | Freeman | ........... | G06F 17/30566 707/803 |
| 2014/0095519 A1* | 4/2014 | Liu | .................. | G06F 17/30938 707/755 |
| 2015/0007022 A1* | 1/2015 | Chen | ................... | G06F 17/3089 715/235 |
| 2015/0019537 A1* | 1/2015 | Neels | ................ | G06F 17/30551 707/722 |
| 2015/0186364 A1* | 7/2015 | Nelson | ............. | G06F 17/30011 707/722 |

* cited by examiner

*Primary Examiner* — Huawen A Peng

(74) *Attorney, Agent, or Firm* — Chapin IP Law, LLC

(57) ABSTRACT

A tabular (relational) DB interface is responsive to SQL commands for accessing unstructured data bases. An application receives a relational data command or query and maps fields from the relational query to fields in an unstructured data store including documents arranged in a hierarchy and unbounded by fixed types or field lengths. The application generates field names by concatenating nested hierarchy field names to define unique "flat file" field names in a tabular form. The application generates a catalog defining the mapping which is used as metadata for accessing the unstructured data to satisfy the relational query. Use of the metadata avoids copying or translating the unstructured data store to a tabular form because the unstructured data collection remains unmodified, and is accessed via the catalog.

19 Claims, 4 Drawing Sheets

TABULAR DB INTERFACE FOR UNSTRUCTURED DATA

RELATED APPLICATIONS

This patent application claims the benefit under 35 U.S.C. §119(e) of U.S. Provisional Patent App. Nos.:

61/958,189, filed Jul. 23, 2013, entitled "SYSTEM AND METHOD FOR ONLINE ANALYTICAL PROCESSING USING AN UNSTRCUTURED DATA STORE;" and 61/959,470, filed Aug. 26, 2013, entitled "SYSTEM AND METHOD FOR SYNCHRONIZATION OF UNSTRCUTURED DATA FOR ACCESS BY RELATIONAL DATABASE MANAGEMENT SYSTEMS."

BACKGROUND

Unstructured databases are becoming a popular alternative to conventional relational databases due to the relaxed format for data storage and the wider range of data structures that may be stored. In contrast to conventional relational databases, where strong typing imposes data constraints to adhere to a predetermined row and column format, unstructured databases impose no such restrictions. Unstructured databases have no formal field or record structure, and may be more accurately characterized as a collection of facts. Unlike their structured counterparts, typically a SQL (Structured Query Language) database, which denotes data in fixed length fields enumerated in records in a tabular form, an unstructured database labels fields for storing values in a document. A set of documents defines a collection, in which the documents in a collection may share some, none, or all of a particular field. Further, the individual fields are relieved from the rigid type and length specifications of a typical relational DB schema (metadata).

SUMMARY

A software application defines a system and method for receiving a relational data command or query maps fields from the relational query to fields in an unstructured data store including documents arranged in a hierarchy and unbounded by fixed types or field lengths. The application generates field names by concatenating nested hierarchy field names of the unstructured document fields to define unique "flat file" field names in a tabular form. Statistics of differently typed values of the same field name facilitate mapping of the similarly typed fields from the relational query to the unstructured data for allowing conditional comparisons for evaluating the query. Comparisons may therefore occur only with occurrences of similarly typed data. The application generates a catalog defining the mapping which is used as metadata for accessing the unstructured data to satisfy the relational query. Use of the metadata avoids copying or translating the entire unstructured data store to a tabular form because the unstructured data collection remains unmodified, and is accessed via the catalog.

The disclosed method automatically synchronizes and creates metadata for data items in an unstructured data store accessible through a relational interface. Document-centric data is becoming increasingly popular and deviations from tabular structures such as NoSQL databases are used to manage this data. In unstructured stores such as JSON (JavaScript Object Notation) collections, the schema is flexible or even non-existent. Relational databases, in contrast, are very mature and widely accepted in most organizations and have a large following. It is therefore desirable for unstructured data to be accessible through a relational interface. However, relational systems have strict and fixed schema definitions while NoSQL databases have no schema or flexible schemas and metadata may change with each data insertion. The disclosed method automatically manages and updates metadata available to the RDBMS (Relational Database Management System) about data that has a flexible schema and is stored in an unstructured data store.

Configurations herein are based, in part, on the observation that database integration with conventional software applications is typically performed via an application programming interface (API) or toolkit for receiving database commands (queries and retrievals) from the application and passing the commands to the database management system (DBMS). Many database integration arrangements employ a SQL API for accessing relational data in a relational database at the bequest of the client application. Since SQL based DBs are widely used, there are ample vendors for integration products and therefore, relational databases tend to be well supported by the application producers.

Unfortunately, conventional approaches to database integration may be difficult to employ with existing applications and utilities directed to SQL based interfaces because SQL relies on a tabular data arrangement of fixed length fields and data types. Accordingly, configurations herein substantially overcome the above-described shortcomings of conventional DB interfaces by providing a tabular DB interface responsive to SQL commands for accessing unstructured data bases. Conventional applications adapted for SQL based interfaces to relational databases may therefore invoke unstructured databases by generating SQL commands and/or queries and the approach outlined herein maps the SQL commands to corresponding fields in the unstructured database.

Even though there are no columns in unstructured systems, for a client application accessing the DB, the concepts of a column and the concept of a document data field are similar. For example, consider an application that needs to find the name of a customer. In an RDBMS system the application will look in the "name" column of the customers table. In unstructured data system, it would look in the "name" field of the customers document collection. However, the similarity deviates in the structure of the data; in unstructured database a document can contain, as a field, another document (a "subdocument"); in RDBMS systems, a columns value cannot be another table; it has to be an atomic or cardinal (simple type) value. There is no equivalent to a subdocument and this is instead implemented using the concept of foreign keys into other tables (i.e. matching a value in one table with a key to another table similar to a pointer).

Alternate configurations of the invention include a multiprogramming or multiprocessing computerized device such as a multiprocessor, controller or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a non-transitory computer-readable storage medium including computer program logic encoded as instructions thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Configurations herein disclose an example system for processing a SQL command operative on a collection of unstructured data. Depicted below are examples of unstructured data and the corresponding operations (typically queries and retrievals). The examples depict typical scenarios of unstructured data represented as JSON collections; other forms of unstructured data may be envisioned by compounding and/or aggregating the disclosed approach. While the unstructured data as illustrated follows a JSON format, the illustrated methods and apparatus are equally applicable to other forms of unstructured data, such as an XML (Extensible Markup Language) form.

Access of unstructured data via a relational query presents obstacles for at least two reasons. The rigidity in columns description or RDBMSs is an inconvenience in an application environment where the structure of the data handled by the application is subject to frequent changes. It presents a fixed view of the data to the application, which is convenient for initial application development, but inconvenient for making changes in the application environment.

Further, a second challenge is that, in unstructured systems, two documents in one collections can have completely different fields, and two fields with the same name can have different attributes (in different data elements)—for example, a fields called "phone" in one document can contain a customer phone number, and in the other document it can contain a Boolean value representing whether the customer should be called. This too can cause problems for the application but of a different kind.

Configurations disclosed below present a system and method where the client application can see and use the data as a strictly defined tabular-based view of the data while the data items are in fact stored in a more flexible document-and-fields collection. To that end, the disclosed approach implements an example system for synchronizing RDBMS column definitions with the continuously changing fields definitions of the document in a collection where the RDMS is a PostgreSQL database and the unstructured data store is a JSON database. Alternate configurations may employ other instantiations of SQL query forms and unstructured data.

Figure 1:
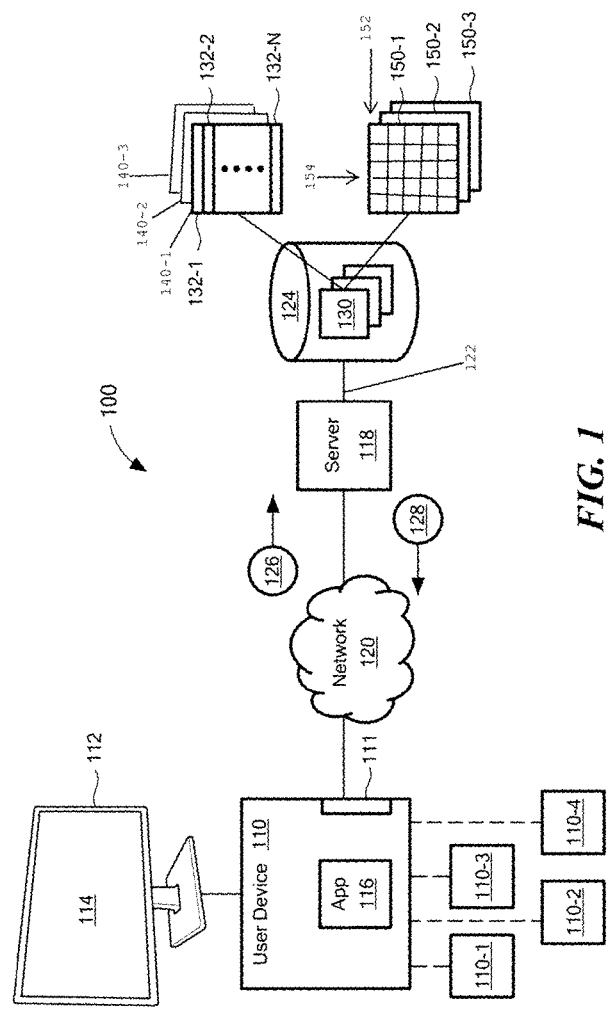
FIG. 1 is a context diagram of a computing environment suitable for use with configurations disclosed herein.

FIG. 1 is a context diagram of a computing environment 100 suitable for use with configurations disclosed herein. The configuration of FIG. 1 shows an example arrangement of computing devices for practicing the principles discussed herein, however any suitable network or local computer platform will suffice. Referring to FIG. 1, a user computing device 110 includes a visual display 112 for rendering a browser or other visual medium, an I/O (Input/Output) interface 111, and an application processor for launching and executing an application 116 for data storage, user queries and/or responses. The visual display 112 present a graphical user interface (GUI) 114 for user interaction, and receives input from a user and renders responses to user queries, as discussed further below. Any appropriate device may be employed, such as mobile devices 110-1 (smartphones, tablets), laptops 110-2, desktops 110-3, or other computing device 110-4 suitable for user interaction, rendering and Internet connectivity. The application 116 interacts with a storage manager server 118 (server), which may be accessible via a public access network 120 such as the Internet. The storage manager server 118 employs one or more network links 122, for accessing a database 124 such as a non-volatile storage medium and having unstructured data stored in a plurality of files 130.

The files include collections 140-1 . . . 140-3 (140 generally) and relational tables 150-1 . . . 150-3 (150 generally). Each collection 140 includes a number of documents 132-1 . . . 132-n (132 generally) of unstructured data, and each relational table denotes rows 152 and columns 154 of traditional relational data. Configurations disclosed herein present a method of storing and accessing the unstructured data in the collections 140, either in conjunction with the relational data or independently, from a relational query such as a SQL statement. Using operations and methods disclosed further below, the application 116 issues a DB command 126 at the bequest of the user (either a query or retrieval) and invokes the server 118 for generating a response 128, such as an acknowledgement of data stored or retrieved data for rendering on the display 112. Configurations herein map the fields of the database command 126 to the fields of the collection 140 for either retrieval (query) or update; a query example will be employed herein. In a simple query, only one collection 140 may be needed to satisfy a response, however more complex queries may require joins between collections 140 or between a collection 140 and table 150, discussed further below.

Traditionally, data storage practices have favored relational databases because the predetermined structure and type arrangements facilitate fast access since locations of particular fields are easily computed. In contrast, the JSON format is a scripted grammar often implemented in a Unicode text file for describing data items as objects. JSON information is composed of many JSON documents. Each documents can be composed of any number of fields, each of a specific type, and also of any number of subdocuments, each of which is also a JSON document, thus defining a recursive structure, capable of representing a hierarchy of documents and included fields. It is possible to store in a field an array of items of the same type or of different types, including arrays and subdocuments. The various documents do not necessarily have the same structure. This kind of approach to information storage is called "unstructured" and is very flexible. This flexibility and ease of use have caused JSON to become the de-facto standard of representing and managing unstructured data in applications.

Since the unstructured data collections cannot rely on a rigid schema for indexing and locating fields, configurations herein identify, based on a field from the tabular DB command, the corresponding field name in the collection. The application 116 generates, from the mapping of the field name, the location of a data value in the collection corresponding to the identified field name from the relational query.

A general consideration concerning mapping of fields to the unstructured data collection is the hierarchy that is defined with compound fields, meaning that a named field is not a simple atomic type, but a subdocument including multiple atomic fields. Such a multidimensional hierarchy is inconsistent with the "flat" structure of a tabular DB table in which each row and column define a simple, atomic type. The flattening operation includes generating unique names for all fields including subfields to arrive at a single "level" structure (rather than a multi-level hierarchy) with field names denoting the nesting of fields. The result is a collection defining a series of documents, each having a set of atomic fields, and may be generated as follows:

Main Function:
1. When the unstructured database starts up, call function "A".
2. When a new document is inserted, call function "B".

Function "A":
1. For each collection in each database,
   a. Call function "D" with the database name and collection name Function "B":
1. Call function "D" with the database and collection name where the new document was just inserted.

Function "D":
1. Receive a database name and a collection name
2. Retrieve from the database system all the possible fields (in all documents).
3. Iterate over all the fields
   a. If the field is by itself a subdocument or an array,
      i. Use function "E" to construct a "flat name" of all subdocument fields
      ii. For each such "flat name", record its type information.
   b. Else
      i. Record the field name and its type information
4. Iterate over the record of field names and type information for each name,
   a. Append to "CREATE FOREIGN TABLE" SQL/MED command
5. Perform a "DROP FOREIGN TABLE" SQL/MED command using the collection name as table name
6. Execute the "CREATE FOREIGN TABLE" SQL/MED" command created at step Function "E":
1. If the given field is a subdocument, for each field of the document,
   a. Call function "E" with the field name and ".", and add the returned value and type to the recoded name-and-type list.
2. Else, if the given field type is cardinal, Create a string composed of "." And the field name and return it.
3. Else, it is an array. Create a string composed of the field name and the string ".0" and return it.

The above approach defines a method and a system that combines the benefits of the two approaches and that unifies the relational and the unstructured data. In one implementation, such a method has been used to unify relational data stored in the PostrgeSQL RDBMS and document data stored in a JSON database where both data is exposed in a single relational view defined within the PostgreSQL subsystem. The integration approach exploits several features:

1. The ability to expose unstructured data stored in a NoSQL store through an RDBMS layer—for example using PostgreSQL's FDW layer, any such variant or by adapting PostgreSQL's code.

2. The ability to create a VIEW object based on real relational tables (and relational data stored within said tables) and tables that are based on unstructured data defined using method 1 above.

Since a view provides an abstraction through which a user or an application can query and access data, the user or application queries data from the view and retrieves a result set that is constructed from data in relational tables as well as data in NoSQL collections. This is all completely transparent to the user or application since they only use the abstraction of the view. The application 116 uses the view definition to decide what to query from the relational table and what to query from the mediation layer that eventually retrieves data from the unstructured data store.

Figure 2:
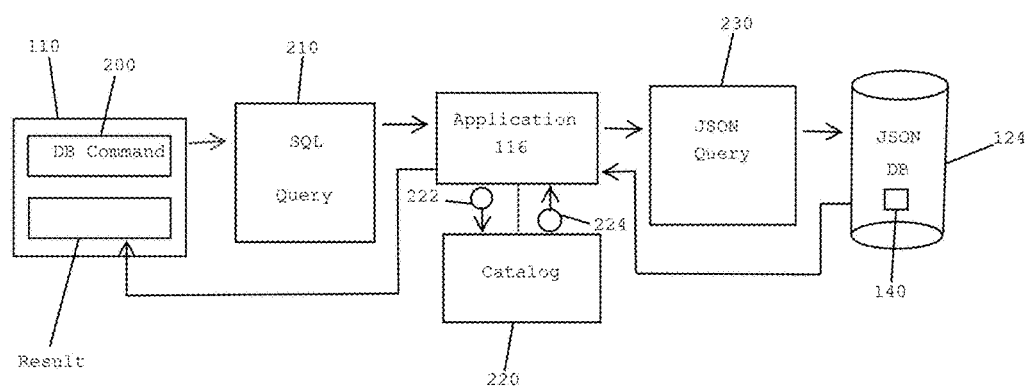
FIG. 2 is a block diagram of information flow in the environment of FIG. 1.

FIG. 2 is a block diagram of information flow in the environment of FIG. 1. Referring to FIGS. 1 and 2, the user device 110 presents an input window 200 responsive to a relational DB command such as a SQL statement, typically a query 210. The application 116 receives the SQL query 210, and invokes a catalog 220 for identifying fields in the collection 140 that correspond to the fields named in the SQL query 210. The application 116 maps each field 222 in the query 210 to a corresponding field 224 in the collection 140. The catalog 220 returns the corresponding field 224 for generation of a JSON query 230 corresponding to the SQL query 210. The JSON query 230 is executed on the collection 140 in the database 124.

The computed catalog 220 effectively links the structured (relational) and unstructured (document collections) form. In the example shown, the catalog of unstructured data is computed by traversing a set of unstructured data, the unstructured data defined by a nested set of documents, each document having fields associated with values, and identifying, for each field in the collection, a type of data values populated for the field. In the case of nested (hierarchical) documents, the field structure is "flattened" to a single level by generating, for each field, a field name unique within the document by appending field names from nested documents. The application 116 computing, for each data value, a reference to a location of the data value in the collection for accessing the named data values from a relational style query. The computed catalog therefore defines metadata usable by relational queries for accessing the identified fields by name.

Figure 3:
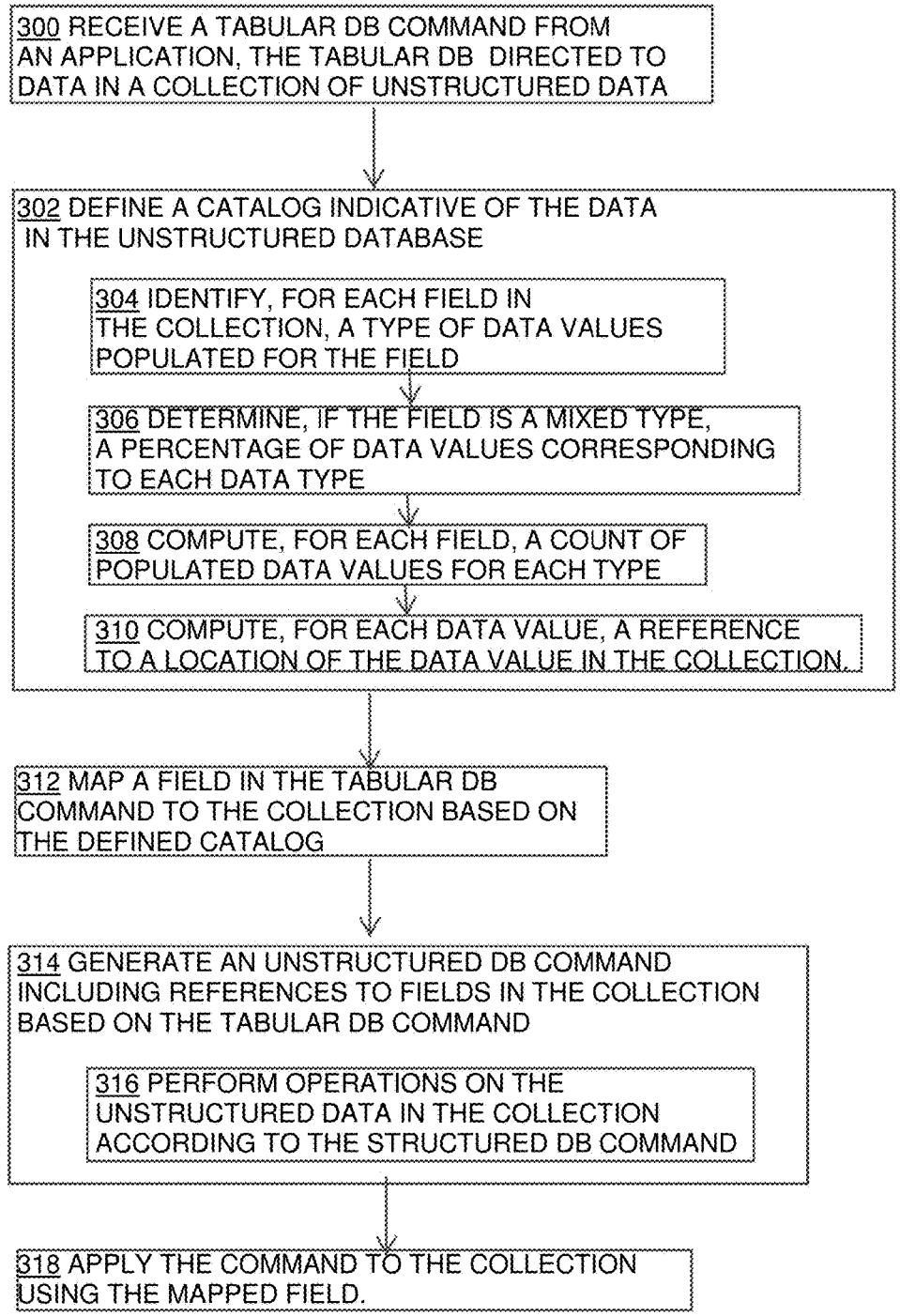
FIG. 3 is a flowchart of the information flow of FIG. 2.

FIG. 3 is a flowchart of the information flow of FIG. 2. Referring to FIGS. 1-3, at step 300 the method of accessing an unstructured database (DB) includes receiving a tabular DB command from a user application such that the tabular DB directed to data in a collection of unstructured data. Many preexisting user applications generate SQL code directed to a SQL database engine. The application 116 receives the SQL command just as a SQL database engine would if integrated with the user application (note the user application invokes the claimed application 116 as a toolkit, plugin, add-on, or other linked or compiled entity operative to perform runtime invocations of the claimed application 116). The application computes a catalog 220, as depicted at step 302, indicative of the data in the unstructured database. This includes, at step 304, identifying, for each field in the collection 140, a type of the data values populated for the field, and determines, if the field is a mixed type, a percentage of data values corresponding to each data type, as shown at step 306. The application 116 computes, for each field, a count of populated data values for each type, as depicted at step 308, and computes, for each data value, a reference to a location of the data value in the collection 140, as disclosed at step 310. The reference may be via a name, pointer, or other suitable mechanism for accessing the particular data value in the collection 140 based on the name provided in the (SQL) DB command 222. The gathered metadata such as field percentages and counts is employed for determining sparsity of particular fields, as some unstructured data collections 140 have a well-behaved field structure with little variance that leads to a near deterministic access pattern, and others have unpredictable field structures with many null and mixed type fields.

The application 116 builds the catalog 220 at any suitable time, typically prior to actually receiving a query or command that invokes the catalog 220. The catalog 220 operates as the metadata into the unstructured data 140 for relational queries 126. Efficiency suggests that unstructured data collections 140 that are expected to receive relational queries would be configured as such by computing the catalog 220 as the data is received or marked for relational usage. Computation of the catalog, since it involves traversing the unstructured collection 140, may incur a processing interval for traversing the fields and identifying the types and type distributions. It would be beneficial to perform such computation of the catalog 220 prior to receipt of a relational query or command 126 for improving response time.

The application 116 maps a field in the tabular DB command to the collection 140 based on the computed catalog 220 (step 312), and generates an unstructured DB command (JSON query) 230 including references to fields 224 in the collection 140 based on the tabular DB command 222, such that the references identify the fields in the collection 140, as depicted at step 314. The application 116 performs operations on the unstructured data in the collection 140 according to the structured DB command 222, typically a query or update, as depicted at step 316, and applies the command 126 to the collection 140 using the mapped field 224 for returning the desired result 128, as depicted at step 318

Figure 4:
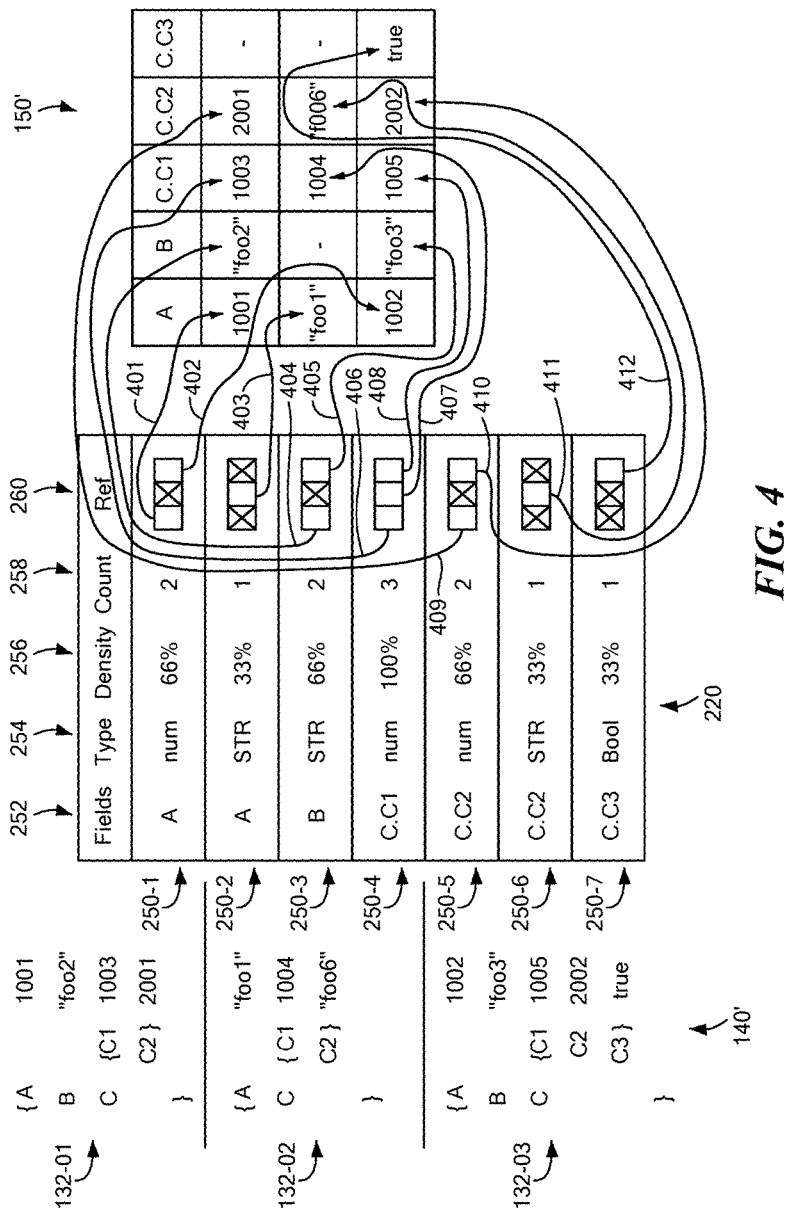
FIG. 4 is a diagram of the catalog and mapping as in FIG. 3.

FIG. 4 is a diagram of the resulting catalog and mapping as in FIG. 3. Referring to FIGS. 1, 2 and 4, the catalog 220 defines the mapping from the fields 222 specified in the relational query to the fields 224 in the unstructured data collection 140. In general, the catalog 220 recognizes a "flattening" effect of reducing the hierarchy of the collection 140 to a "flat file" representation of atomic fields (or "leaves") nested within the hierarchy. The nested fields are named by a dot "." notation to denote subfields. The subfields refer to documents nested as fields within other documents. By traversing the hierarchy of the collection 140, the catalog 220 derives atomic or simple type (numeric, string, Boolean, or array) to denote the nested fields which correspond to relational fields 222 named in the SQL query 210. If the hierarchy were viewed or mapped as a tree structure, the atomic types represent the leaves of the tree from which no further field nesting occurs.

The collection 140, therefore, defines a hierarchy of documents, such that the documents include field types that are documents of sub-fields. The computed catalog 220 represents a flattened arrangement of the hierarchical documents, in which each field of the catalog 220 is uniquely named to denote an atomic field. An atomic field is a simple type represented by a single ordinal or cardinal value, such as a numeric, string, Boolean, or a sequence (array) of the same simple types that may be stored in-line.

In FIG. 4, the application maps an example JSON collection to a relational representation 150' of fields via the catalog 220. Note that the representation 150' depicts what a relational file corresponding to the unstructured data would look like; the data is accessed via the catalog 220 and retrieved from the collection 140. Alternate structures may be employed for the catalog for denoting fields and locations of the unstructured data 140 sought, based on the received relational query 210. In other words, the catalog 220 identifies the populated fields in the collection 140 so that value comparisons from the SQL query 210 are made for determining query "hits" (conditional matching). Arrows 401-412 show a physical mapping to actual fields in a relational example of the unstructured data; actual references may be performed by any suitable manner, and it should be noted that the actual relational table representation 150' need not be created-only the mapping so that the application 160 may reference and "look at" the data values in the unstructured collection 140. The collection 140 need not be copied or transformed into an actual table depicted as 150'.

It should be noted that the table '150 is a logical representation of a table depicting the unstructured data set 140'. In implementation, an alternative rendering would be employed because it is well established that the rigid typing of relational data tables 150 cannot mix types. The catalog 220 employs the frequencies as metadata for supporting the implementation of loosely typed field names. Several approaches may be employed. For example, the data type with the maximum frequency may be employed, with the remainder nulled. Such an approach is likely reserved for implementations where deviations are of a trivial number of fields. Another alternative is to split the column into multiple columns one per type—e.g. C.C2.STRING and C.C2.NUM, similar to the manner of handling subdocument types. Also, another option is to use a JSON data type which is now supported by an increasing number of relational databases—in effect it is similar to a generic or pointer type and the burden is on the app developer to decide what to do with the returned data.

Some SQL engines employ so-called "foreign keys" as a way to integrate foreign data sources that were not stored by the SQL engine itself. In an example arrangement, configurations herein define a foreign data wrapper (FDW), such that the FDW is responsive to SQL commands and configured to define the reference to the location of the data item. The foreign data wrappers receive references to the computed locations of the collection fields 140, and are responsive to field mappings from the SQL command 222 to the collection 140. The computed field mappings are used by as a foreign key or reference to integrate the SQL interface engaged by a client application with the application 116 for accessing the fields of the collection 140.

In general, "collections" refer to unstructured, data, and "tables" refer to relational tables with rigid type and length constraints. Since a collection need not have an entry for each field in every document, some fields remain unpopulated (the equivalent of a null). In processing a query, however, document ordering should be preserved so that related fields in the same document remain associated. Accordingly, a bit mask denotes population of a field at a particular document 132 position in the collection 140. Other mechanisms for denoting the ordering and population may be employed for preserving the ordering of the documents and fields contained therein.

In the examples herein, the collection 140 includes a set of documents, and each of the documents include at least one field, which may itself be a compound field such as another document. Defining the catalog 220 further includes, for each document, computing a field name based on the type and a name of the field in the document, and creating or locating the computed field name in the catalog. Since there are no required fields, any document may introduce a new field, however fields are often replicated across the documents in a collection (i.e. each document has an "address" or a "name," for example). The application 116 updates the count and percentage of documents populated with the field, to identify sparse fields, and maintains a mapping from the computed field name to a corresponding field in the tabular DB command for use in processing the SQL DB command 222.

For each atomic type (tree leaf) in the collection 140', the catalog 220 includes an entry 250-1 . . . 250-7 (250 generally) denoting occurrences of each field and type combination in the collection. For fields that occur with multiple types, entries 250 occur for each type. In each entry, the name 252 denotes the concatenated name of each atomic field. A type 254 denotes the type of data value, and occurs for each type of the corresponding named field. The density 256 denotes a percentage of the documents having the field for each type, and a count 258 indicates the total number of documents having the field, for identifying sparse occurrences of particular names and types. A reference 260 includes a bit mask or other indicator of documents 132 in the collection having a populated value; the remainder being null. Alternatives include specific ordering or flag structures to indicate the presence or absence of a named field in a particular document such that document order is preserved.

A particular aspect includes processing of compound fields, since each element in a relational table typically defines a simple type. If the identified type of the data values is a compound type, the application recursively identifies an atomic data value resulting from decomposition of the compound type. Nesting of compound fields may require several levels of traversal to break down a field into constituent simple types and values. The application computes a field name based on a concatenation of names of the fields of the compound type, and maps the computed field name to a corresponding field in the DB command. The resulting field name denotes subfields as a dot notation derivative of their parent field, and appends the parent field or fields to generate a unique list of field names as a flat file, similar to a column list of a relational table.

Arrows 401-412 show the particular fields in the relational representation denoted by the catalog; the arrows may not denote specific locations or address, but rather indicate the general logical structure of the fields and the manner in which access to specific fields occurs via the catalog 220. Arrows 401 and 402 denote numerical occurrences of "A" in documents 132-01 and 132-03, respectively. Arrow 403 denotes the single occurrence of a string value for "A" in document 132-02, and complements entry 250-1 to denote "A" in each document. Arrows 404 and 405 refer to string values for "B" in documents 132-01 and 132-03; as there is no "B" in document 132-02, it is null. Arrows 406, 407 and 408 point respectively to field "C1" of subdocument C in each of documents 132-01, 132-02 and 132-03. The named field "C.C1" derives from a concatenation of the subfield names. Arrows 409 and 410 designate numeric entries for "C.C2" in documents 132-01 and 132-03, and arrow 411 designates a complementary string representation in document 132-02. Arrow 412 designates a sole occurrence of Boolean value in "C.C3," from document 132-03. In an example as shown in FIG. 4, an example depiction of field references are defined in the catalog. Other mechanisms for mapping the fields and defining references to the data values may be performed in alternate configurations.

A further step involves determining if the decomposed compound type is an array, and computing a field name by appending an ordinal value to the computed field name. Arrays may therefore be stored in-line as a series of similarly typed values, or may be named as separate fields with a subscript appended as part of the field name, i.e. ".0", ".1", ".2", etc.

Emphasis thus far has been placed on accommodating SQL queries in exclusively unstructured databases. However, often relational query requests span more than one relational table in order to satisfy all the fields needed for a query response. Accordingly, multiple collections, or a mix of unstructured collections and relational tables may be joined. The application 116 receives a DB command 126 indicative of a plurality of tabular databases 150, and identifies a plurality of data collections 140 for satisfying the received command. The application invokes the catalog 220 corresponding to each of the identified data collections 140, and performs a join on the identified data collections for rendering a result responsive to the command.

In particular configurations, queried data is employed in a subsequent application, such as a statistical package or a spreadsheet. Since a typical unstructured database (collection 140) can be quite large, each iteration to change or augment a format to suit a particular application can be time consuming. It is beneficial, therefore, to generate (export) data in a form which is immediately usable as input to a subsequent application, i.e. output the data in a form usable as input. Accordingly, the application 116 generates, for each document in the collection, an output entry to correspond to the document. The output entry includes, for each of the computed field names, the data value corresponding to the computed field name, if the data value is populated, and an indication of a null value, if the data value is not populated. A field terminator delineating each data value in the output entry is inserted at the end of the document. Such a format, such as a comma separated value (CSV) form, is often employed by third-party developers for importing data.

In another configuration, the application 116 generates a frame of data depicting a relational table as a parameter to an external application or suite of programs. The application generates output entries with CSV (Comma Separated Value) fields, thus generating a sequences of row structures representing the unstructured data. The application then returns a generated reference to the plurality of output entries, the output entries defining a frame of data and responsive to an external application for receiving the frame. Such a frame structure is representative of a relational table, having rows of columns based on the CSV values, and can be received by external applications such as "R", MAT- LAB® and other statistical, mathematic and scientific packages that receive data in a standard or normalized form.

In conventional approaches, CSV and similar "generic" data forms are employed as conduits to transfer data between applications. CSVs allow a lightweight interface that is highly adaptable. However, the rigid typing of conventional DB models facilitates conventional transfers because the importing entity relies on the strong typing to delimit and type the fields. In configurations disclosed herein, type converters label and map the data from generated CSV output into external packages that receive the CSV data. The catalog 220 is used to generate metadata that defines the CSV data for import into the external packages. The application 116 generates, based on the catalog 220, CSV metadata indicative of the data types of the CSV output. The generated metadata is used to determine the column types that get created in table views for the external package.

The approach described above may be employed in on-line analytical processing (OLAP) based on unstructured databases rather than a relational database, therefore being document based, rather than relational or multidimensional. Document-based, unstructured, NoSQL databases maintain data as documents. Certain document based databases maintain data as JSON documents or XML documents. A set of documents are maintained within a collection. The disclosed approach depicts a method for building an OLAP system that uses the underlying document store rather than a relational store. The method can be used for relational and multidimensional storage forms since in both cases cubes are designed and managed using the underlying store.

Such a configuration uses metadata that is either maintained or computed in order to generate the structure of the cubes, dimensions, measures and hierarchies. Contrary to a relational store where data is maintained in tables that are defined by a fixed structure, documents have no structure or have a structure that can dynamically change. It may even be possible to have a collection with many documents where each document has a different structure. However, in order to build and maintain cubes some structure has to be defined. The method uses metadata that is either maintained continuously or that is computed in batches that are then used to define the cube definitions that then are used to drive the OLAP system.

A further distinction is the fact that in conventional systems, much of the definitions that occur have to do with joins between tables. In all traditional OLAP systems, because the underlying store is a relational database (usually using either a star schema or a snowflake schema), many tables have to be joined when issuing the SQL that populates the cubes or that returns data used for satisfying an MDX query. In contrast, the data can be thought of as being stored in a highly de-normalized way in which all the measures and dimensions usually sit within a single or few collections and where the relevant dimension data may be embedded in sub documents. The system disclosed makes use of this fact in order to both simplify the implementation and respond to queries extremely fast without having to pre-aggregated data.

Those skilled in the art should readily appreciate that the programs and methods defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of accessing an unstructured database (DB), comprising:
   receiving a tabular DB command from an application, the tabular DB directed to data in a collection of unstructured data;
   computing a catalog indicative of the data in the unstructured database, computing the catalog further comprising:
      identifying, for each field in the collection, a type of data values populated for the field;
      determining, if the field is a mixed type, a percentage of data values corresponding to each data type;
      computing, for each field, a count of populated data values for each type; and
      computing, for each data value, a reference to a location of the data value in the collection;
   mapping a field in the tabular DB command to the collection based on the computed catalog; and
   applying the command to the collection using the mapped field, further comprising:
      generating an unstructured DB command including references to fields in the collection based on the tabular DB command;
      applying the generated command to the collection; and
      performing operations on the unstructured data in the collection according to the generated unstructured DB command.

2. The method of claim 1 wherein the collection includes a set of documents, each of the documents including at least one field, and computing the catalog further comprises:
   for each document
      computing a field name based on the type and a name of the field in the document;
      creating or locating the computed field name in the catalog;
      updating the count and percentage of documents populated with the field; and
      maintaining a mapping from the computed field name to a corresponding field in the tabular DB command.

3. The method of claim 1 wherein the identified type of the data values is a compound type, further comprising:
   recursively identifying an atomic data value resulting from decomposition of the compound type;
   computing a field name based on a concatenation of names of the fields of the compound type; and
   mapping the computed field name to a corresponding field in the DB command.

4. The method of claim 3 further comprising:
   determining if the decomposed compound type is an array; and
   computing a field name by appending an ordinal value to the computed field name.

5. The method of claim 3 wherein the collection defines a hierarchy of documents, the documents including field types that are documents of sub-fields, further comprising:
computing a catalog representing a flattened arrangement of the hierarchical documents, each field of the catalog uniquely named to denote an atomic field.

6. The method of claim 1 further comprising:
identifying, based on a field from the tabular DB command, the corresponding field name in the collection; and
generating, from the mapping of the field name, the location of a data value in the collection corresponding to the identified field name.

7. The method of claim 1 further comprising:
receiving a command indicative of a plurality of tabular databases;
identifying a plurality of data collections for satisfying the received command;
invoking the catalog corresponding to each of the identified data collections; and
performing a join on the identified data collections for rendering a result responsive to the command.

8. The method of claim 2 further comprising:
generating, for each document in the collection, an output entry;
the output entry including, for each of the computed field names:
the data value corresponding to the computed field name, if the data value is populated; and
an indication of a null value, if the data value is not populated; and
a field terminator delineating each data value in the output entry.

9. The method of claim 8 further comprising:
generating output entries with CSV (Comma Separated Value) fields; and
generating a reference to a plurality of output entries, the output entries defining a frame of data and responsive to an external application for receiving the frame; and
generating, based on the catalog, CSV metadata indicative of the data types of the generated output entries, the external application responsive to the CSV metadata for receiving the plurality of output entries.

10. The method of claim 1 further comprising defining a foreign data wrapper (FDW), the FDW responsive to SQL commands and configured to define the reference to the location of the data item.

11. The method of claim 1 further comprising generating unique names for each of the fields including subfields to define a single level structure having field names denoting the nesting of fields.

12. A server for accessing an unstructured database (DB), comprising:
an interface to a user adapted to receive a tabular DB command from an application, the tabular DB directed to data in a collection of unstructured data;
a catalog indicative of the data in the unstructured database, the catalog based on
identifying, for each field in the collection, a type of data values populated for the field;
determining, if the field is a mixed type, a percentage of data values corresponding to each data type;
computing, for each field, a count of populated data values for each type; and
computing, for each data value, a reference to a location of the data value in the collection;
an application configured for mapping a field in the tabular DB command to the collection based on the computed catalog; and
an interface to the unstructured database for applying the command to the collection using the mapped field, the application is further configured to:
generate an unstructured PB command including references to fields in the collection based on the tabular DB command;
apply the generated command to the collection; and
perform operations on the unstructured data in the collection according to the structured DB command.

13. The server of claim 12 wherein the catalog defines:
an identity of, for each field in the collection, a type of data values populated for the field;
if the field is a mixed type, a percentage of data values corresponding to each data type;
a count of populated data values for each type; and
for each data value, a reference to a location of the data value in the collection.

14. The server of claim 13 wherein the collection includes a set of documents, each of the documents including at least one field, and the application is further operable to:
for each document
compute a field name based on the type and a name of the field in the document;
create or find the computed field name in the catalog;
update the count and percentage of documents populated with the field; and
maintain a mapping from the computed field name to a corresponding field in the tabular DB command.

15. The server of claim 13 wherein the identified type of the data values is a compound type, the application further configured to
recursively identify an atomic data value resulting from decomposition of the compound type;
compute a field name based on a concatenation of names of the fields of the compound type; and
map the computed field name to a corresponding field in the DB command.

16. The server of claim 14 wherein the collection defines a hierarchy of documents, the documents including field types that are documents of sub-fields, the catalog representing a flattened arrangement of the hierarchical documents, each field of the catalog uniquely named to denote an atomic field.

17. The server of claim 13 wherein the application is further configured to invoke the catalog to:
identify, based on a field from the tabular DB command, the corresponding field name in the collection; and
generate, from the mapping of the field name, the location of a data value in the collection corresponding to the identified field name.

18. The server of claim 13 further comprising:
a command indicative of a plurality of tabular databases;
a plurality of data collections for satisfying the received command;
the application configured for:
invoking the catalog corresponding to each of the identified data collections; and
performing a join on the identified data collections for rendering a result responsive to the command.

19. A computer program product on a non-transitory computer readable storage medium having instructions that, when executed by a processor, perform a method for accessing an unstructured database (DB), comprising:

receiving a tabular DB command from an application, the tabular DB directed to data in a collection of unstructured data;

defining a catalog indicative of the data in the unstructured database, defining the catalog further comprising:

identifying, for each field in the collection, a type of data values populated for the field;

determining, if the field is a mixed type, a percentage of data values corresponding to each data type;

computing, for each field, a count of populated data values for each type; and computing, for each data value, a reference to a location of the data value in the collection:

mapping a field in the tabular DB command to the collection based on the defined catalog; and applying the command to the collection using the mapped field, further comprising:

generating an unstructured DB command including references to fields in the collection based on the tabular DB command;

applying the generated command to the collection; and performing operations on the unstructured data in the collection according to the generated unstructured DB command.

* * * * *